United States Patent
Wagner et al.

(10) Patent No.: US 10,733,798 B2
(45) Date of Patent: Aug. 4, 2020

(54) IN SITU CREATION OF PLANAR NATURAL FEATURE TARGETS

(71) Applicant: QUALCOMM Incorporated, San Diego, CA (US)

(72) Inventors: Daniel Wagner, Vienna (AT); Qi Pan, Vienna (AT)

(73) Assignee: QUALCOMM Incorporated, San Diego, CA (US)

(*) Notice: Subject to any disclaimer, the term of this patent is extended or adjusted under 35 U.S.C. 154(b) by 305 days.

(21) Appl. No.: 13/802,834

(22) Filed: Mar. 14, 2013

(65) Prior Publication Data
US 2014/0267397 A1  Sep. 18, 2014

(51) Int. Cl.
G06T 19/00 (2011.01)
G06T 7/246 (2017.01)
G06T 7/73 (2017.01)

(52) U.S. Cl.
CPC ........... *G06T 19/006* (2013.01); *G06T 7/246* (2017.01); *G06T 7/74* (2017.01); *G06T 2207/30244* (2013.01)

(58) Field of Classification Search
CPC .............................. G06T 19/006; G06T 19/00
USPC .......................................................... 345/633
See application file for complete search history.

(56) References Cited

U.S. PATENT DOCUMENTS

| | | | |
|---|---|---|---|
| 8,446,468 B1 * | 5/2013 | Medoni | G06K 9/00791 348/144 |
| 2005/0190972 A1 * | 9/2005 | Thomas et al. | 382/218 |
| 2009/0226094 A1 * | 9/2009 | Yamazaki | 382/190 |
| 2010/0208057 A1 * | 8/2010 | Meier et al. | 348/135 |
| 2010/0220891 A1 * | 9/2010 | Lefevre | G06T 7/20 382/103 |
| 2011/0150280 A1 | 6/2011 | Tsuji | |
| 2011/0262003 A1 | 10/2011 | Woo et al. | |
| 2011/0275409 A1 * | 11/2011 | Lee | G06F 1/1643 455/556.1 |
| 2012/0062702 A1 | 3/2012 | Jiang et al. | |
| 2012/0105358 A1 | 5/2012 | Momeyer et al. | |
| 2012/0120113 A1 | 5/2012 | Hueso | |
| 2012/0201469 A1 * | 8/2012 | Livet et al. | 382/201 |

(Continued)

FOREIGN PATENT DOCUMENTS

CN 1957373 A 5/2007
WO 2011154558 A2 12/2011

OTHER PUBLICATIONS

W. Lee, Y. Park, V. Lepetit, and W. Woo. Point-and-Shoot for Ubiquitous Tagging on Mobile Phones. In Proc. IEEE/ACM International Symposium on Mixed and Augmented Reality, 2010.*

(Continued)

*Primary Examiner* — Jin Ge
(74) *Attorney, Agent, or Firm* — Pamela K. Soggu

(57) ABSTRACT

Disclosed are a system, apparatus, and method for in-situ creation of planar natural feature targets. In one embodiment, a planar target is initialized from a single first reference image one or more subsequent images are processed. In one embodiment, the planar target is tracked in six degrees of freedom upon the processing of the one or more subsequent images and a second reference image is selected from the processed one or more subsequent images. In one embodiment, upon selecting the second reference image the planar target is refined to a more accurate planar target.

40 Claims, 8 Drawing Sheets

(56) References Cited

U.S. PATENT DOCUMENTS

2012/0269388 A1   10/2012   Jiang et al.
2012/0300979 A1   11/2012   Pirchheim et al.
2013/0050258 A1*  2/2013   Liu ..................... G02B 27/017
                                                    345/633

OTHER PUBLICATIONS

G. Simon, A.W. Fitzgibbon, and A. Zisserman, "Markerless Tracking Using Planar Structures in the Scene," Proc. Int'l Symp. Augmented Reality 2000 (ISAR 00), IEEE CS Press, Los Alamitos, Calif., 2000, pp. 120-128.*

M. Fiala and A. Ufkes, "Visual Odometry Using 3-Dimensional Video Input," in poster session of the 8th Canadian Conference on Computer and Robot Vision (CRV 2011), St. John's, Newfoundland, Canada, 2011.*

Schweighofer G., A. Pinz: Robust pose estimation from a planar target. IEEE Transactions on Pattern Analysis and Machine Intelligence, 28(12):2024-2030, 2006.*

Kim K, Lepetit V, WooW. Scalable real-time planar targets tracking for digilog books. Vis Comput 2010;26(6-8):1145-54.*

Klein G., et al., "Parallel Tracking and Mapping on a Camera Phone", Mixed and Augmented Reality 2009, ISMAR 2009, 8th IEEE International Symposium on IEEE, Piscataway, NJ, USA, Oct. 19, 2009 (Oct. 19, 2009), pp. 83-86.

Grabner M., et al.,"Learning Features for Tracking", CVPR '07. IEEE Conference on Computer Vision and Pattern Recognition ; Jun. 18-23, 2007; Minneapolis, MN, USA, IEEE , Piscataway, NJ , USA, IEEE Jun. 1, 2007 (Jun. 1, 2007), pp. 1-8, XP031114252, ISBN : 978-1-4244-1179-5.

International Search Report and Written Opinion—PCT/US2014/018787—ISA/EPO—dated May 19, 2014.

Schall G., et al.,"3D tracking in unknown environments using on-line keypoint learning for mobile augmented reality", Computer Vision and Pattern Recognition Workshops, 2008. CVPR Workshops 2008 IEEE Computer Society Conference on, IEEE , Piscataway , NJ, USA , Jun. 23, 2008 (Jun. 23, 2008), pp. 1-8, XP031285690, ISBN : 978-1-4244 -2339-2.

Hinterstoisser S., et al., "Learning Real-Time Perspective Path Rectification", International Journal of Computer Vision, Jan. 2011, vol. 91, Issue 1, pp. 107-130.

Oberkampf D., et al., "Iterative pose estimation using coplanar points," Computer Vision and Pattern Recognition, 1993, pp. 626-627.

European Search Report—EP19211717—Search Authority—Munich—dated Feb. 4, 2020.

Hinterstoisser S., et al., "Learning Real-Time Perspective Patch Rectification", International Journal of Computer Vision, Kluwer Academic Publishers, BO, vol. 91, No. 1, Sep. 15, 2010 (Sep. 15, 2010), pp. 107-130, XP019871902, ISSN: 1573-1405, DOI: 10.1007/S11263-010-0379-X abstract sections 4.1, 4.3.

* cited by examiner

IN SITU CREATION OF PLANAR NATURAL FEATURE TARGETS

FIELD

The subject matter disclosed herein relates generally to planar target creation and tracking.

BACKGROUND

Camera sensor data or images can be used as input to build a 3D map of an environment. In an augmented reality (AR) system, virtual objects can be inserted into a device display, the virtual objects interacting with or replacing real/physical world objects. An AR system can include input from a camera sensor to record real world objects as images or video, and display an AR view on the device display.

AR systems can implement a tracking system to estimate a user's position and orientation (pose) relative to a reference. Traditional tracking systems are limited by the type of reference tracked as well as by initialization procedures used to begin tracking. For example, in traditional tracking systems, a previously acquired reference or an artificial marker may be used to initialize tracking of a 3-Dimensional (3D) model of an environment. Otherwise, without the previously known reference, objects may appear at the wrong location or float around the map of the environment.

A tracking system utilizing a single camera may also rely upon initializing a 3D map from two subsequent reference images captured by the single camera. Creating a 3D map using traditional techniques based on the two reference images is only possible if the camera motion between the two reference images is appropriate, and also maintains enough overlap between the scenes in both images.

Traditional tracking implementations may also rely on direct user input to select the two reference images or may provide an additional visual target to record 6 degrees of freedom (6 DoF) camera motion before a 3D map can be initialized.

For example, some tracking methods require the user to perform a specific unintuitive motion sequence without visual feedback so that 3D reconstruction methods can be used to find a real plane of the target.

As a result of the above limitations of traditional methods of tracking technologies the current augmented reality user experience can feel unnatural. Moreover, most users are unlikely to know or understand the motions necessary for traditional tracking initialization using two reference images. Typical users are also frequently confused as to why they should have to perform the specific motions before an augmented reality system can display tracking updates for a scene.

Accordingly, improved user-friendly 3D environment initialization and tracking are desired.

SUMMARY

Embodiments disclosed herein may relate to a method for planar target creation and tracking. The method includes initializing a three-dimensional target from a single first reference image and prior to processing a subsequent image. The method further includes processing one or more subsequent images, and tracking the planar target in six degrees of freedom (6 DoF) upon the processing of the one or more subsequent images. The method further includes selecting a second reference image from the processed one or more subsequent images and refining the planar target to a more accurate planar target.

Embodiments disclosed herein may also relate to a computer readable non-transitory storage medium with instructions to perform planar target creation and tracking. The medium includes initializing a three-dimensional target from a single first reference image and prior to processing a subsequent image. The medium further includes processing one or more subsequent images, and tracking the planar target in 6 DoF upon the processing of the one or more subsequent images. The medium further includes selecting a second reference image from the processed one or more subsequent images and refining the planar target to a more accurate planar target.

Embodiments disclosed herein may also relate to an apparatus that includes means for initializing a three-dimensional target from a single first reference image and prior to processing a subsequent image. The apparatus further includes means for processing one or more subsequent images, and means for tracking the planar target in 6 DoF upon the processing of the one or more subsequent images. The apparatus further includes means for selecting a second reference image from the processed one or more subsequent images, and means for refining the planar target to a more accurate planar target.

Embodiments disclosed herein may further relate to a data processing system including a processor and a storage device configurable to store instructions to perform planar target creation and tracking. The instructions cause the processor to initialize a three-dimensional target from a single first reference image and prior to processing a subsequent image. The instructions further cause the processor to process one or more subsequent images, select a second reference image from the processed one or more subsequent images, and track the planar target in 6 DoF, and refine the planar target to a more accurate planar target.

In other embodiments, the planar target is assumed as initialized from a fronto-parallel view and the entire reference image is used to initialize the planar target.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1:
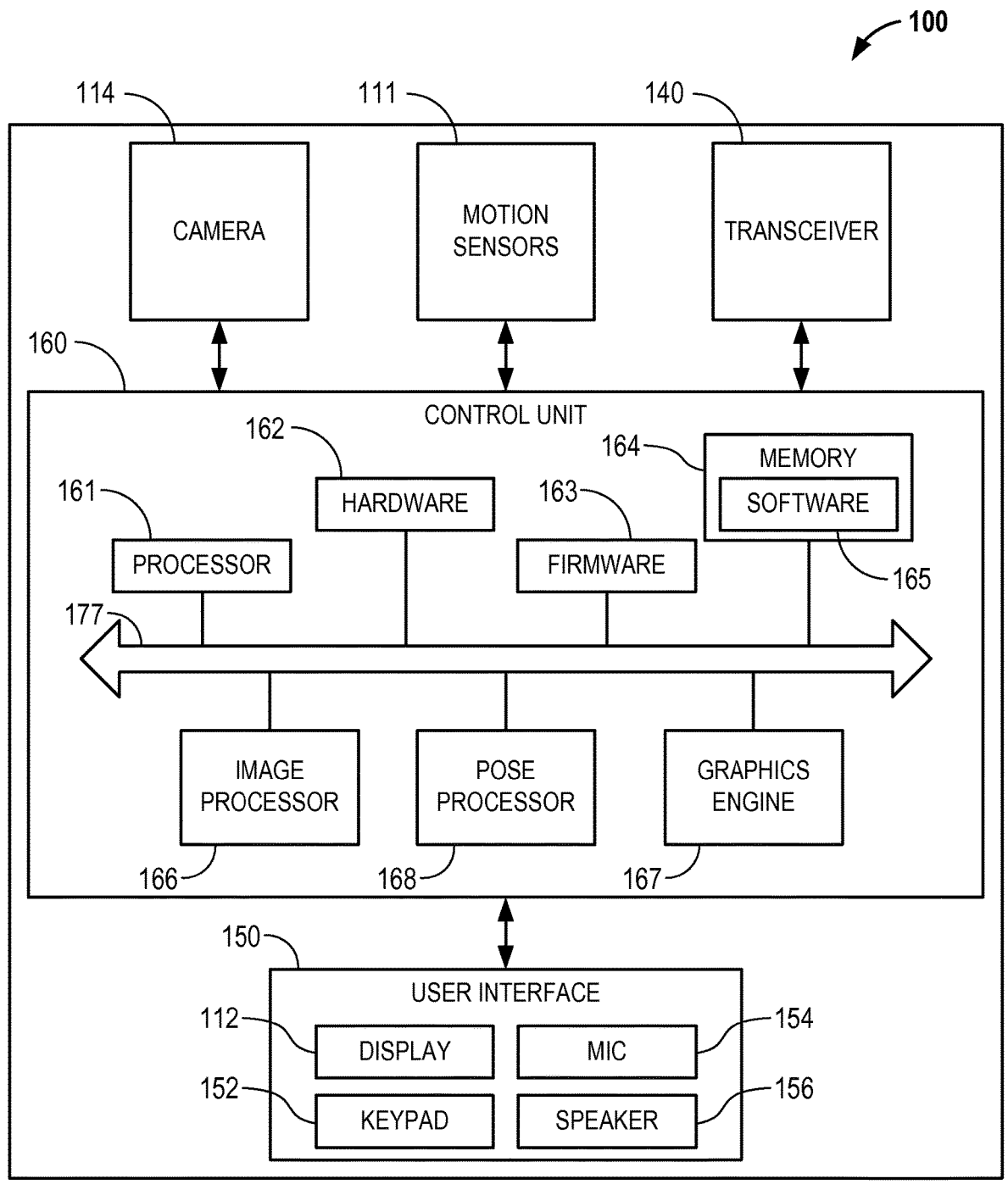
FIG. 1 is a block diagram of one embodiment of a system capable of performing disclosed methods.

FIG. 1 is a block diagram illustrating a system in which embodiments of the invention may be practiced. The system may be a device 100, which may include a general purpose processor 161, image processor 166, pose processor 168, graphics engine 167 and a memory 164. The device 100 may also include a number of device sensors coupled to one or more buses 177 or signal lines further coupled to at least one of the processors 161, 166, and 168. The device 100 may be a: mobile device, wireless device, cell phone, personal digital assistant, wearable device (e.g., eyeglasses, watch, head wear, or similar bodily attached device), mobile computer, tablet, personal computer, laptop computer, or any type of device that has processing capabilities.

In one embodiment, device 100 may be a mobile/portable platform. The device 100 may include a means for capturing an image, such as camera(s) 114 and/or CMOS sensors (not shown) and may optionally include motion sensors 111, such as accelerometers, gyroscopes, electronic compass, or other similar motion sensing elements. Device 100 may also capture images on a front and/or rear-facing camera (e.g., cameras 114). The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include various other elements, such as a satellite position system receiver, power device (e.g., a battery), as well as other components typically associated with portable and non-portable electronic devices.

The device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

In one embodiment, an in-situ target creation module (ITC) as described herein may initialize a planar target instantly from a single reference image. The term module is used to refer to hardware, firmware, software, or some combination thereof that is capable of performing the recited functions. For example, an ITC may receive images or video from a single camera 114 or monocular visual input. Planar target initialization may occur upon processing the single reference image and before any other images are processed. The ITC may process the single reference image (e.g., extract feature points associated with a target) and may estimate a 6-degree of freedom camera position and orientation (pose) from a set of point correspondences (e.g., features from two or more images). As used herein, the detection of feature points and the estimation the 6 DoF camera pose for the feature points are jointly referred to as "tracking" the target. The ITC may initialize the planar target without prior knowledge of the user's environment (e.g., without a prepopulated map, CAD model, markers in the scene or similar predefined target descriptor) and without the use of two different precise reference images. In some embodiments, the ITC may provide visual (e.g., displayed target adjustment) feedback during initialization.

The ITC may output or display an augmented reality (AR) representation of the input images or video after receiving images or video input. In some embodiments, the ITC may display the AR representation (e.g., a modification or addition of a virtual object into a real world scene) of the target in real-time, near real-time, within a short time window, or instantaneously upon initialization of the target from a single image depending on the capabilities of the device 100. In some embodiments, the ITC module may initialize and display the AR representation without any additional sensor input (e.g., without the aid of an accelerometer, laser rangefinder, gyroscope, GPS, or other sensors used for determining position). Therefore, expensive and complex multiple camera array systems can be minimized and the ITC may be coupled to commonly available camera sensors. For example, the ITC may be coupled to a single camera, mobile device such as a smartphone, or wearable device such as AR eyeglasses.

In one embodiment, the ITC can initialize the planar target by treating (e.g., passing a viewpoint parameter/configuration during initialization) the entire captured camera image (e.g., the single reference image) as a fronto-parallel view of a target object. In other embodiments, the ITC may initialize the planar target with a portion or sub-section of the whole camera image. The ITC may create an accurate dataset for planar target natural feature tracking without any predetermined markers or tags.

Because the ITC can fully initialize a planar target from a single reference image, no additional specific camera motions or input are used before tracking can begin. In some embodiments, the ITC may track a scene or object immediately, in real-time, near real-time, or within a short time window of receiving the reference image and may provide concurrent real-time AR updates to the display (e.g., an augmentation of the target). By enabling target tracking from initialization of a single initial reference image, users are naturally (i.e. without specific prompting or instructions) encouraged to continue to move/reposition the camera and explore a target or scene with the camera. Greater exploration of a scene at different angles and viewpoints allows the ITC to collect additional subsequent images that can be tested for sufficient translation from the first reference image. Once an image with sufficient translation is detected, the image can be assigned as a second reference image to be used in triangulation or further refinement of the map, target, and camera pose.

Figure 2:
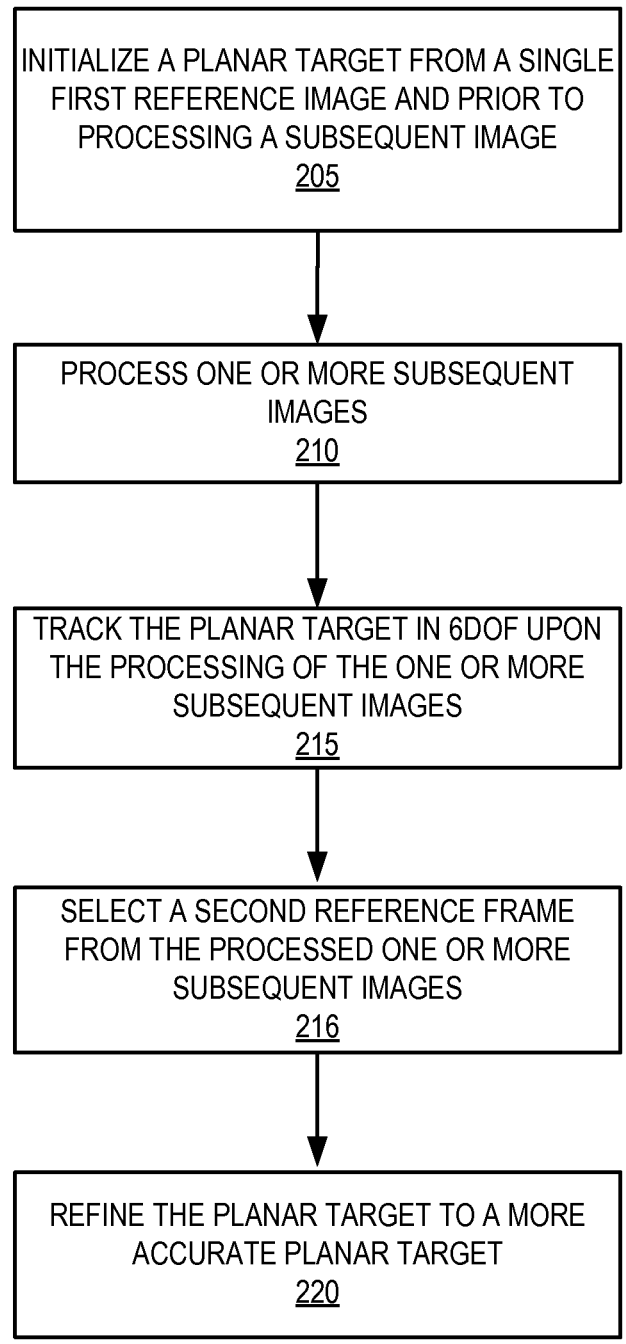
FIG. 2 illustrates a flow diagram of one embodiment of a method for in-situ target creation.

FIG. 2 illustrates a flow diagram of one embodiment of in-situ target creation. At block 205, the ITC can initialize a planar target from a captured image (e.g., as a single reference image) and prior to processing any other/subsequent images. In some embodiments, the initialization may occur immediately, in real-time, near real-time, or within a short time window of the reference image capture. The ITC may create the planar target based on the processing of the single reference image. As used herein planar is used to describe objects approximately flat with a two-dimensional surface. For example, processing a captured image (e.g., an initialization image captured from camera 114) can include calculating a set of extracted features or feature points and treating the single reference image as a fronto-parallel view of a target. Initialization of the planar target is described in greater detail below.

At block 210, the ITC may process one or more subsequent images. Processing can include determining a set of features within the subsequent image. The set of features may be the same features determined after processing the single reference image, however the reference feature location for one or more features may be different in the subsequent image if the camera pose changed since processing the single reference image.

At block 215, the ITC can track the planar target (e.g., a planar natural feature target) in six degrees of freedom upon the processing of the one or more subsequent images. In some embodiments, the ITC tracking may occur immediately, instantaneously, in real-time, near real time, or within a short time period following receipt by the ITC of the single reference image. Tracking the target may include comparing locations of each feature point from the single reference image with corresponding features in subsequent image(s) and determining a change in location of one or more of the same feature points found in both images. For each subsequent image (e.g., an image captured and processed after the initial reference image) the ITC may update the reference feature locations to provide an updated camera pose.

The ITC may continue tracking a target (e.g., scene, object, or map) based on processing of one or more subsequent images (e.g., one or more images captured at a later point in time from the capture of the single reference image). In some embodiments, the ITC may also cause the device display to output an augmented reality representation of the target immediately, in real-time, near real-time, or within a short time window of the initialization of the planar target.

At block 216, the ITC may select a second reference image from the processed one or more subsequent images. For example, a second reference image may be selected upon the ITC determining that the translation of the second reference image relative to the first reference image meets a translation threshold.

At block 220, the ITC may further refine the planar target to a more accurate planar target. For example, the ITC may optimize the camera and model (target) based on accumulated feature(s) from a subsequent image that meets a translation threshold. Further details on refinement of the planar target are described below.

In some embodiments, the ITC can initialize a planar target immediately, in real-time, near real-time, or within a short time window of receiving a captured image (i.e., single reference image) and prior to processing any subsequent images. In some embodiments, the ITC may create a complete planar target based entirely on the processing of the single reference image.

Further, in some embodiments, the ITC may not have access to and may not solicit input pertaining to predetermined information about a target such as object or scene markers, map, alternate sensor data measurements or other target information collected before an initial captured image.

In some embodiments, a device (e.g., device 100) may automatically start, execute, or run the ITC (e.g., by using processor 161) without any direct or manual user interaction. In some embodiments, the device may capture a first image from a camera (e.g., camera 114) and send the image to the ITC for planar target initialization, tracking, and/or augmented reality processing. Alternatively, in some embodiments, the ITC may cause the device to prompt a user to start initialization and tracking of a target by touching a touch screen, pressing a button, or similar input. The ITC may also be integrated into an application or program, and the application or program can capture the single reference image and trigger the ITC.

In some embodiments, the captured image may be received from an image feed on the device or a user may initiate the capture of the captured image. The single reference image may be automatically captured by camera 114 when camera movement or motion is detected. Captured images may be still camera images or frames from a video feed.

A feature (e.g., feature point or interest point) as used herein is as an interesting or notable part of an image. The features extracted from the image may represent distinct points along three-dimensional space (e.g., coordinates on axes X, Y, and Z) and every feature point may have an associated feature location. The single reference image may have reference features that are used for comparison to features found in subsequent images. The features in subsequent images either match or fail to match (i.e. are the same) as the reference features of the single reference image. Feature detection may be an image processing operation to examine every pixel to determine whether a feature exists at a particular pixel. Feature detection may process an entire image or, alternatively certain portions or parts of the image.

For each captured image or video frame, once features have been detected, a local image patch around the feature can be extracted. Features may be extracted using a well-known technique, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used. When the number of extracted features for an image is determined to exceed a threshold (e.g., 100 point features or other number of points) the image can be saved as the single reference image and the extracted features can be defined as reference features/points (or extracted feature points) of a target.

A target, as used herein, may include extracted features from a single isolated object within an image, or multiple objects. For example, an entire scene captured in an image may include multiple objects and each object may have one or more extracted features. A group of objects within an image or scene may also have a collective combined feature set associated with the entire group.

The ITC may use features from the entire single reference image to create the planar target. To determine the target, the ITC may make an initial assumption that all features lie on a plane parallel to the camera plane (reference features may be initialized at a same distance/depth from the camera perpendicular to the viewing direction).

The initialized planar target may be stored in memory (e.g., memory 164) and associated with one or more features extracted or calculated from the single reference image.

In one embodiment, ITC may enable target tracking immediately, in real-time, near real-time, or within a short time window of initialization of the planar target. In some embodiments, the ITC may provide immediate, real-time, or near real-time camera tracking from the single reference image to subsequently captured images. In some embodiments, the tracking methods outlined herein may facilitate ITC tracking of partially occluded targets. Moreover, the methods disclosed may facilitate ITC tracking of targets independent of a particular rotation of the object (e.g., horizontal or vertically aligned objects are equally viable for ITC tracking).

In one embodiment, as the device moves relative to the target (e.g., one or more objects or the scene within the reference image), the camera can continue to capture and process subsequent additional images of the target from the different viewpoints. The ITC can output an AR representation associated with the processed images to the device display (e.g., display 112). In one embodiment, in-situ target creation provides real time feedback and may provide instant, real-time, or near real-time display of any tracking errors such that a user is encouraged to provide further camera motion. Additional camera motion can provide useful additional image references to further refine the target. For example, even with initial tracking errors, the ITC can provide a target representation accurate enough to promote further scene exploration by the user until a second reference image is discovered. A second reference image can be used to further reduce any errors and refine the target. In one embodiment, initial preliminary target tracking errors are reduced when the first reference image is close/approximate to a fronto-parallel view relative to the target being tracked.

Figure 3:
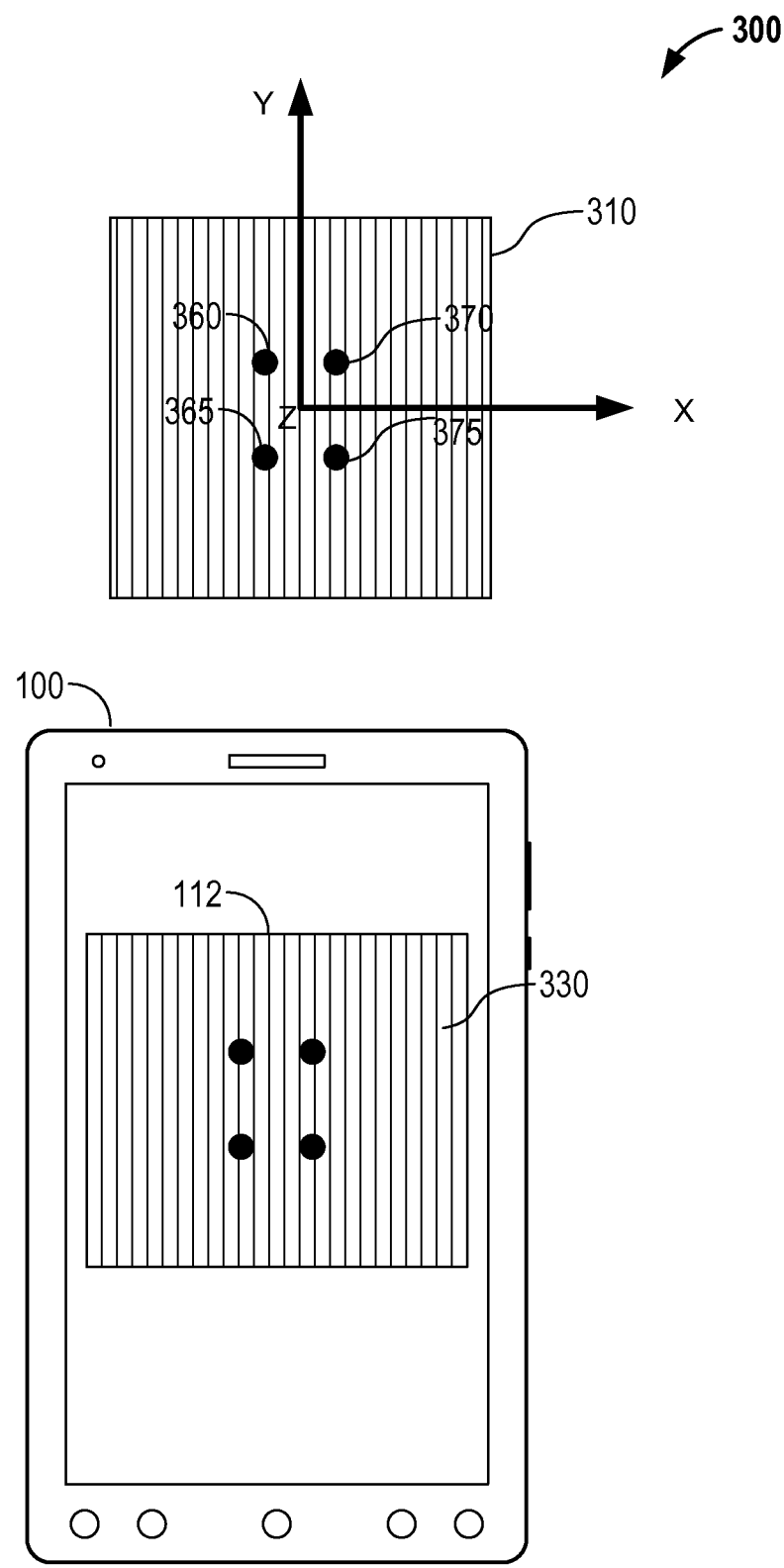
FIG. 3 illustrates an exemplary target that is fronto-parallel to the camera plane.

FIG. 3 illustrates a target that is fronto-parallel to the camera plane. FIG. 3 illustrates four circular objects 360, 365, 360, and 375 on a planar target 310. The four objects lie along the same plane such that each object has the same Z coordinate and equal depth from the camera/device plane. The device 100 can display (e.g., through the device display 112) a representation 330 of the real world object 310. The representation 330 of the real world object 310 can include augmented reality as described in greater detail below.

In general, the ITC may operate on images that are approximately fronto-parallel to obtain a reference image and is not limited to exactly fronto-parallel target capture and processing. The ITC may assign the entire first reference image 430 as the target and assume a fronto-parallel view in cases where the camera plane is not exactly fronto-parallel to the target.

Figure 4:
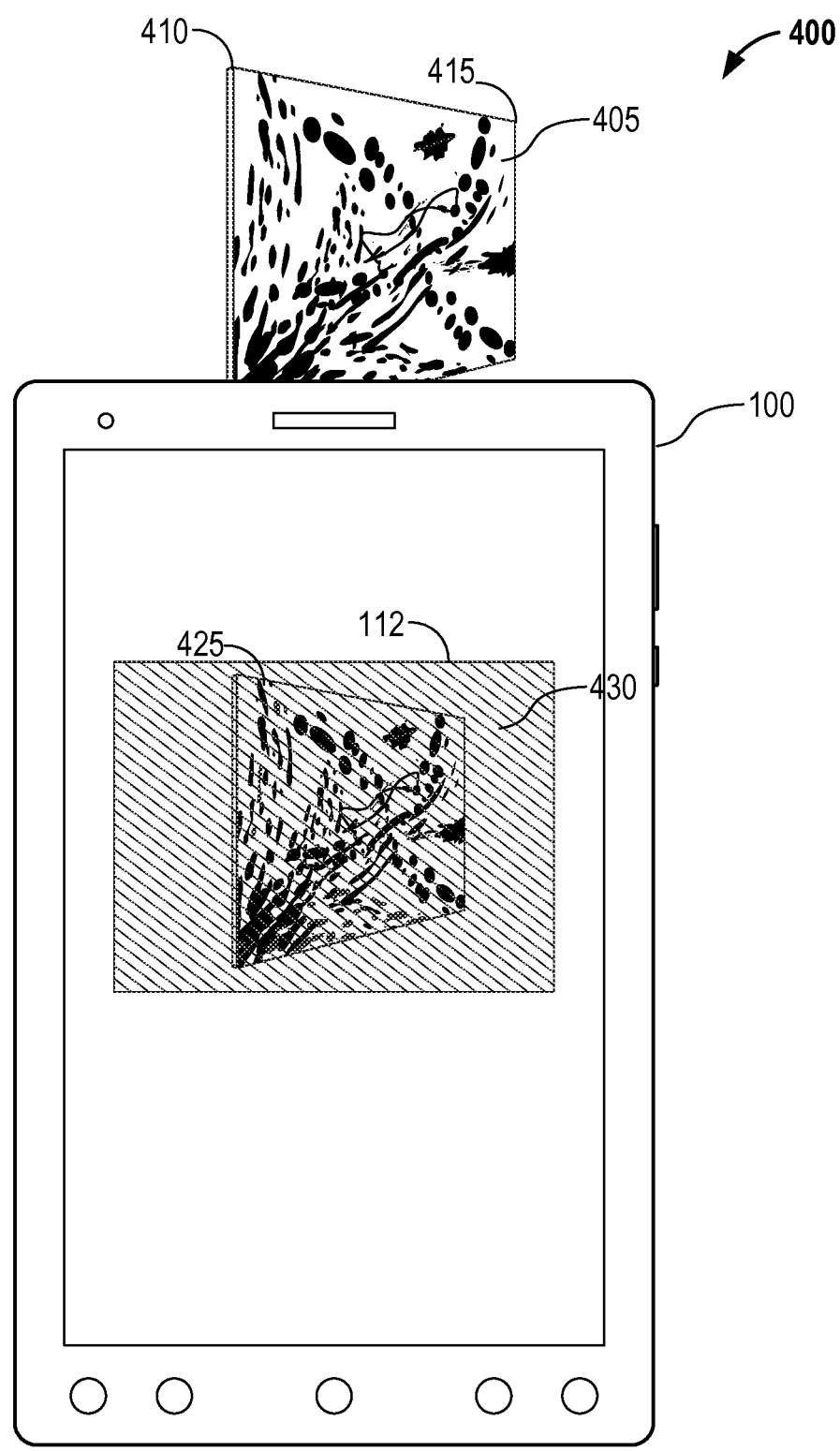
FIG. 4 illustrates a first viewpoint from a device positioned approximately in front of a planar target.

FIG. 4 illustrates a first viewpoint from a device positioned approximately in front of a planar target, in one embodiment. FIG. 4 illustrates a roughly fronto-parallel viewpoint of a target 405 (e.g., a painting) from the perspective of device 100. The device 100 can display (e.g., through the device display 112) a representation 425 of the real world object 405. The representation 425 of the real world object 405 can include augmented reality as described in greater detail below. The example first viewpoint 400 illustrates creation of a target 430 based on the entire image in display 112. FIG. 4 illustrates the corners 410 and 415 (features) may lie on a different Z coordinates, and may have different depths relative to the camera 114 plane.

Figure 5:
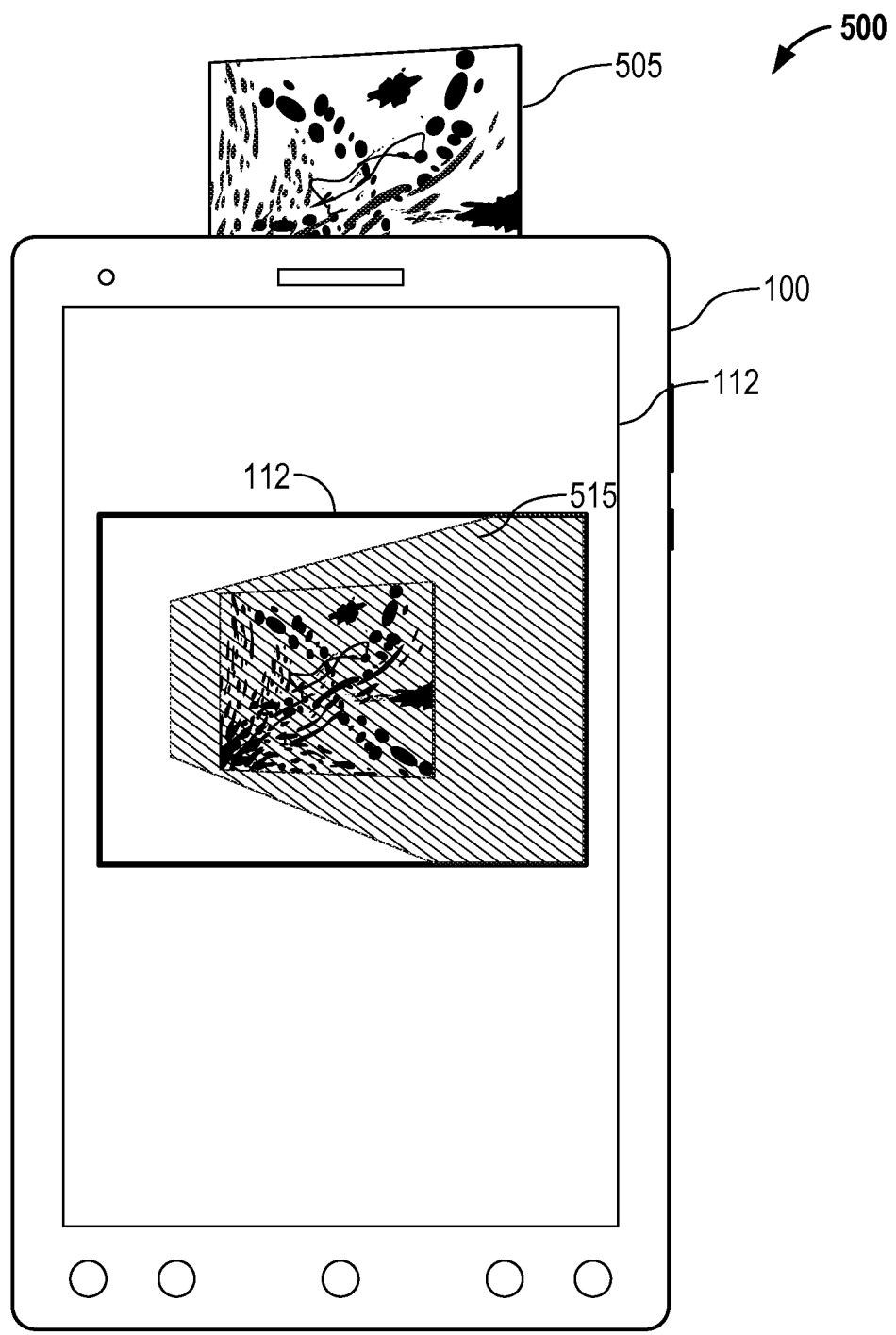
FIG. 5 illustrates a second viewpoint from a device positioned in front of a planar target.

FIG. 5 illustrates a second viewpoint from the device 100 positioned approximately in front of a planar target, in one embodiment. FIG. 5 illustrates strong distortion 515 due to tracking target (i.e., the entire first reference image 430) from the first viewpoint. The distortion 515 of the reference image 430 may also generate a distorted AR representation. For example, although the initial assumption of using the entire reference image 420 may be approximate, tracking can be accurate enough to encourage further user interaction. The user, upon viewing the representation of the target (e.g., distorted AR displayed on the device display 112) may naturally attempt to reposition the device 100 and capture an alternate angle of the target. After subsequent reference images are processed (e.g., a second reference image is determined to have enough translation) the ITC can accurately triangulate the target features to calculate the area covered by the planar target in the first and second reference images and the planar target's true plane normal in the first and second reference images.

Figure 6:
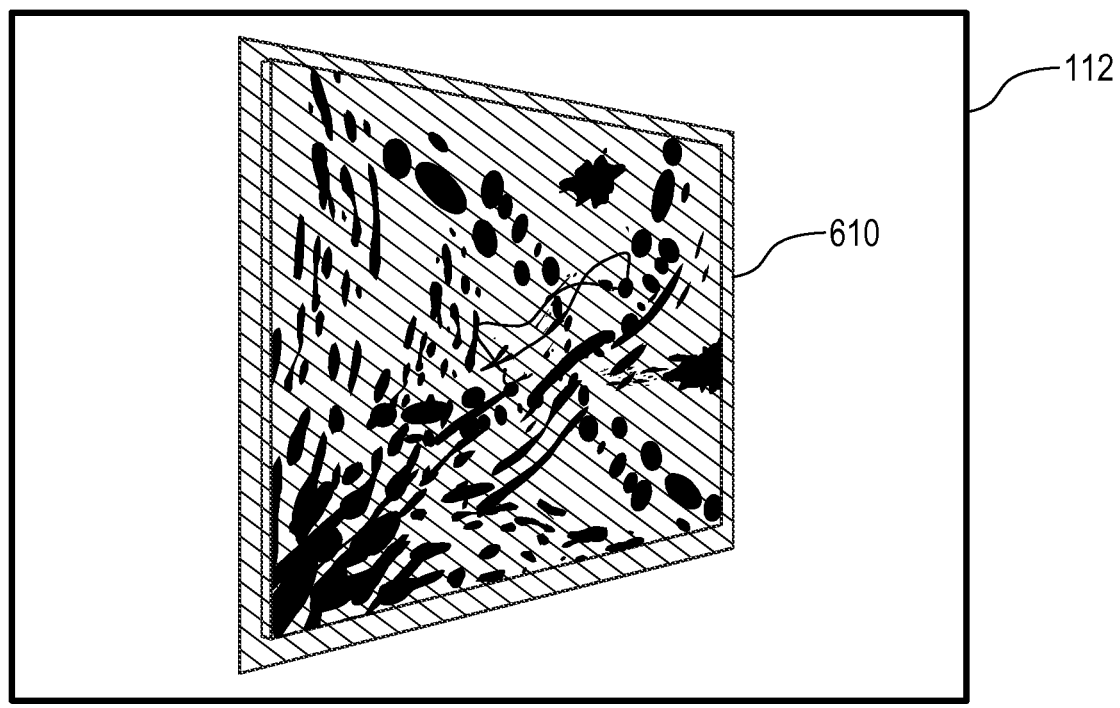
FIG. 6 and FIG. 7 illustrate the same device viewpoints from FIG. 4 and FIG. 5 respectively, with respective target representations having correctly estimated target planes, in one embodiment.
Figure 7:
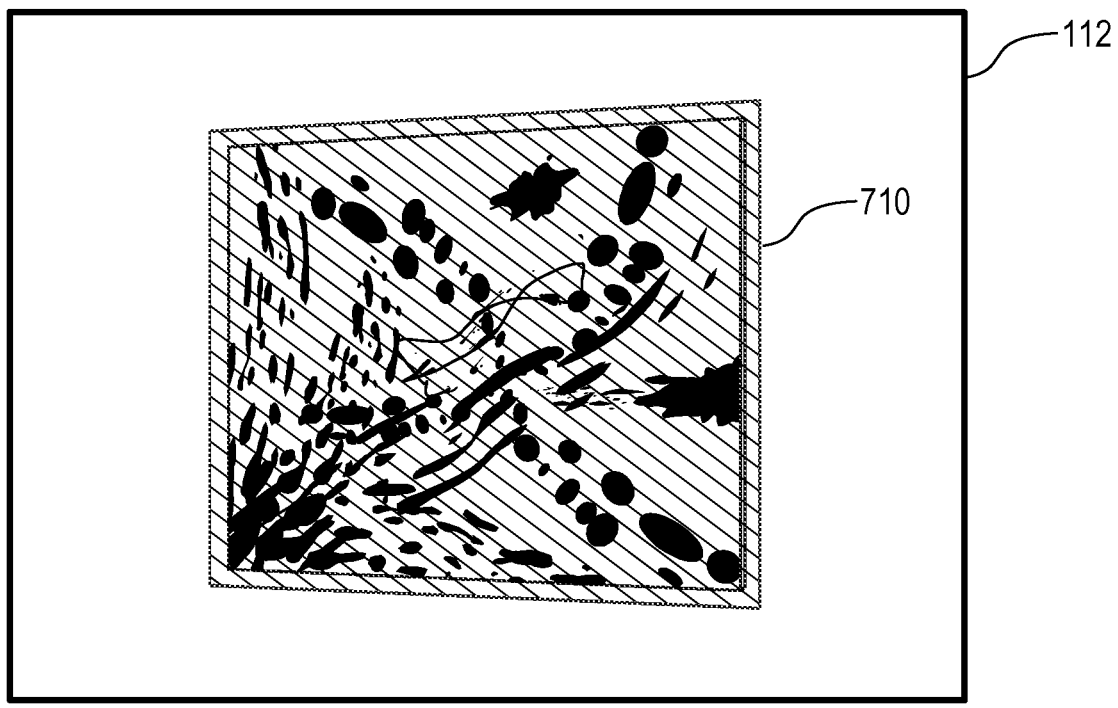

FIG. 6 and FIG. 7 illustrate the same device viewpoints of FIG. 4 and FIG. 5 respectively, except with the respective target representations 610 and 710 having correctly estimated target planes, in one embodiment. For example, the ITC initializes with the entire first reference image as the planar target in FIG. 4, and upon determining a second reference image with sufficient baseline or translation, the ITC can correctly estimate the target as illustrated in FIG. 6 and FIG. 7.

FIG. 6 and FIG. 7 have correct warping (e.g., after triangulation of the first and second reference frames) and can accurately augment a representation of the real world object when used in an AR system. For example, the shaded areas of FIG. 6 and FIG. 7 may be replaced or overlaid with a different object other than the original painting 405 (e.g., inserting a new painting, commercial advertisement, user selected image, video or some other AR object as a replacement).

In one embodiment, the ITC identifies the target in an image and determines the target's position and orientation relative to a coordinate system and/or relative to a camera plane. This information can be used, for example, to allow a user to use a device as an AR system or can be used by a robot to navigate an unknown environment. The camera position and orientation (pose) can be described by means of a rotation and translation transformation, which brings the object from a reference pose to the observed pose. This rotation transformation can be represented in different ways (e.g., as a rotation matrix, a quaternion, or other representation).

In one embodiment, the ITC automatically selects the parts (e.g., extracted feature points) of a scene that can be updated given the observed camera 114 motion. In one embodiment, the ITC can automatically select, from images captured while camera 114 is in motion and recording images, a second reference image to use for full 3D map initialization. Furthermore, the ITC can estimate the camera 114 motion from the initial planar target and provide instantaneous camera tracking before a second image frame is received or processed. In one embodiment, the ITC may operate without user input, and without reliance on any other external tracking methods.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In one embodiment, the user experience of an AR device can be greatly enhanced by automatically updating the AR displayed on the device as the user moves the device and without prior knowledge of the user's environment. For example, in some embodiments, ITC may operate without a map, CAD model, markers in the scene or similar. The ITC may also enhance the user's experience by providing visual feedback (e.g., AR updates to the target represented on the display 112) without multiple different and precise image captures. In some embodiments, visual updates to the AR system may be provided to the display and user in real-time, near real-time, almost instantaneously, or within a short time window of capturing the first reference image.

Movement of device 100 and/or camera 114 may cause the display to update, in real-time, or near real-time, an augmentation of the target (e.g., one or more objects or scenes) being tracked. With movement of the device away from an initial reference image position, the device can capture additional images from alternate views. As the alternate views are displayed, scene augmentation can become more accurate while the ITC processes the additional images. In one embodiment, when the camera 114 moves and camera pose changes (e.g., by user or robot initiated movement) the ITC may select an appropriate image to be used as a second reference image. The second reference image may be selected from an image feed or stream. In one embodiment, upon discovery of an image with sufficient translation from an initial reference image, the discovered image may be automatically assigned as a second reference image. The features from the second reference image may be extracted and triangulated with features from the first image frame to refine the target and increase tracking accuracy. After extracting features and triangulating from the second reference image, increased accuracy of the augmentation can be achieved (e.g., borders around an object may fit more precisely, the representation of the object in the scene will appear more realistic, and target placement can be more accurate relative to the camera 114 pose).

In one embodiment, an object or graphic may be inserted or integrated into a video stream (or image) captured by the camera 114 and displayed on display 112. In some embodiments, the ITC may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by the ITC. For example, an animated object can "move" within a scene depicted in the augmented reality display.

A person of skill in the art will recognize that embodiments described herein can be implemented in ways other than AR (e.g., robot positioning or other implementation to utilize in-situ creation of planar natural feature targets).

Figure 8:
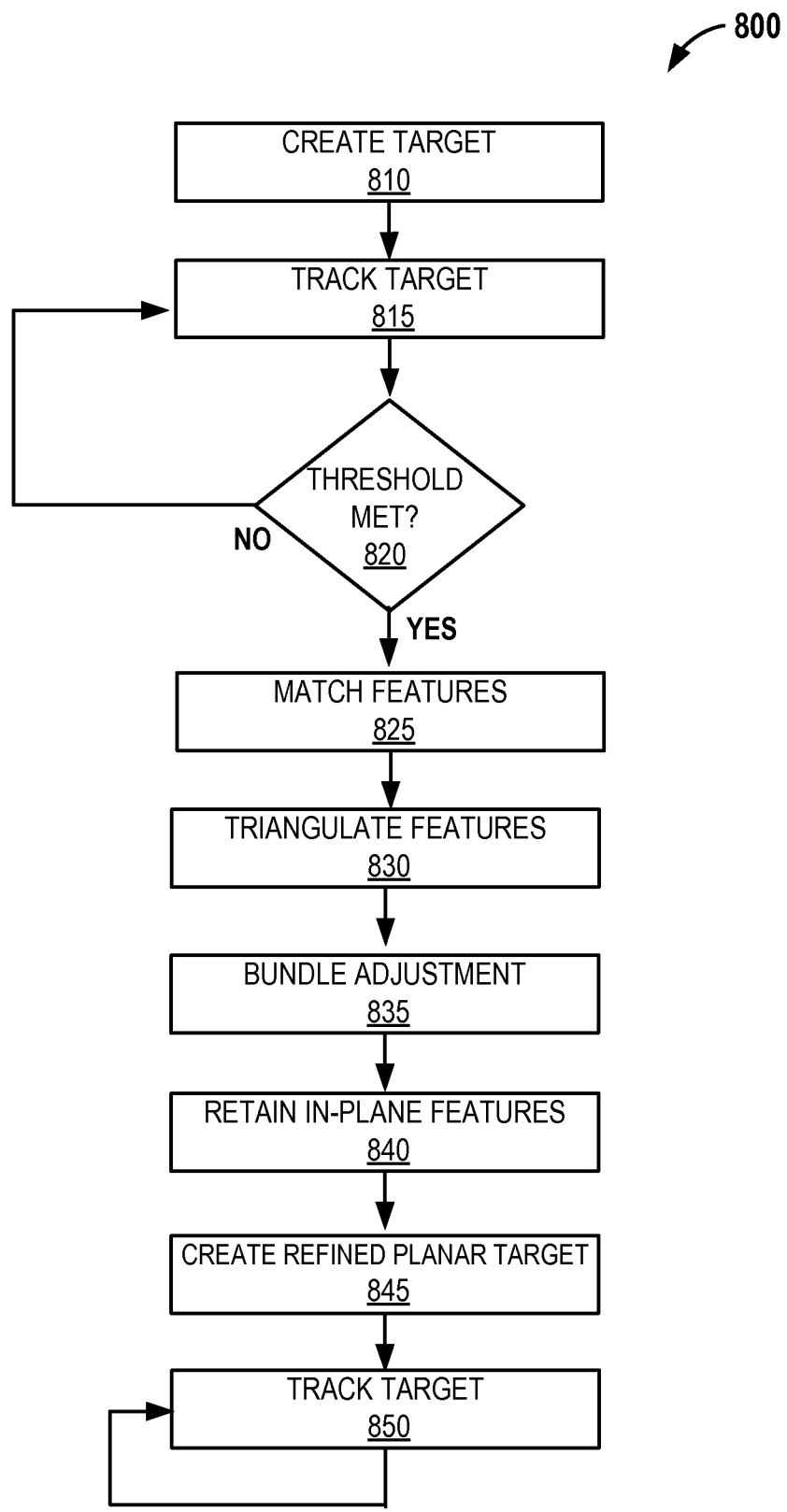
FIG. 8 illustrates a flow diagram of another embodiment of a method for in-situ target creation.

FIG. 8 is a flow diagram illustrating one embodiment of in-situ target creation. At block 810, the ITC can create or initialize a planar target from a first reference image as described above.

At block 815, the ITC can begin tracking the target. In one embodiment, initial target tracking is initiated when the camera 114 moves (e.g., in 6 DoF) in any direction. In one embodiment, the ITC tracks the target in 6 DoF while the camera or image sensor maintains least partial line of sight (i.e., not entirely occluded) to the target.

At block 820, the ITC can determine whether a translation or baseline threshold is met for before selecting the current captured image as the second reference image to use for refining the target. For example, the translation threshold may be based on amount of movement or change in camera pose from a first camera pose of the first reference image (e.g., the camera pose at the moment the first reference image was captured), to the second camera pose of the second reference image (e.g., the camera pose at the moment the second reference image was captured). The camera movement results in the formation of an angle between the viewing direction from the first camera position to the second (i.e., current) camera position. When the angle is large enough (i.e., a predetermined threshold value is achieved) for a sufficient number of features, the ITC can execute the robust triangulation using the first reference image and the second reference image.

In one embodiment, when a threshold translation occurs, the ITC can assign the image associated with meeting the translation threshold (e.g., a subsequent/captured image) as a second reference image and continue to block 825. Otherwise, the ITC can continue to track the initial planar target at block 815. In one embodiment, the ITC can iterate through multiple images (e.g., from a series of frames captured from camera 114) processing each image to determine if the translation threshold is met.

At block 825, the ITC can match one or more extracted/calculated features (e.g., feature points, or reference features) from the first reference image with the second reference image.

At block 830, the ITC can triangulate matched features based on the first and second reference image and their respective features. The ITC may process two images depicting the same section of an object or scene from different viewing directions. The ITC can find correspondences (i.e., same scene feature points found in both the first and second images). The ITC can calculate the 3D structure of these corresponding feature points along with the motion that moved the camera from the first reference image to the second reference image.

At block 835, the ITC can perform a bundle adjustment to more accurately estimate the relative camera pose and feature points (e.g., 3D feature coordinates). The feature points may represent a position of one or more points in three-dimensional space, each point described by three Cartesian coordinates. Given a set of images depicting a number of feature points from different viewpoints, bundle adjustment can be defined as simultaneously refining the 3D coordinates describing scene geometry as well as the parameters of the relative motion and optical characteristics of the camera employed to acquire the image. In some embodiments, bundle adjustment can help to minimize the re-projection error between image locations observed and predicted image points. Bundle adjustment may take into account the viewing parameters (e.g., camera pose, intrinsic calibration and radial distortion) in order to obtain an optimal reconstruction regarding the noise related to the observed image features.

At block 840, the ITC may retain in-plane features. In one embodiment, ITC may reduce the set of all features to those that lie in a plane, and create a new target dataset using (e.g., selecting) either the single reference image (i.e., first reference image) or the second reference image, depending on which reference image is better suited to represent the estimated plane. In one embodiment, the ITC can unwarp the first or second reference images to create a target from a rectified view if neither the first nor the second reference images are close enough to a fronto-parallel threshold.

At block 845, the ITC can further optimize camera and model (target) based on accumulated feature(s) from additional reference images. In one embodiment, the ITC optimizes the camera and model based on recorded movements (e.g., movement subsequent to the initial reference image) of the camera. As the camera moves (e.g., by user initiated movement or robotic movement), the display can update in real time. Receiving real time feedback can encourage a user to continue moving the camera. Additional camera movement can provide further refinement of the model and greater accuracy in tracking. For example, in an augmented reality context, the device displays an integrated graphic or object into the scene and the graphic or object is positioned in the scene such that when the camera is moved (e.g., movement in one or more 6 DoF) the graphic or object maintains its relative position to other objects or the environment (relative to the position and orientation determined from the first reference image).

At block 850, the ITC can continue to track the refined target and optionally provide an augmented representation of the target to the display. The ITC may output the refined target to another module for continued tracking and AR display.

The teachings herein may be incorporated into (e.g., implemented within or performed by) a variety of apparatuses (e.g., devices). In one embodiment, the ITC can be implemented as an engine executed by a processor to receive images or video as input. One or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processor-implemented method for planar target creation and tracking, the method comprising:
    determining a planar target in a first reference image captured at a first camera pose of a camera, wherein the planar target includes one or more features;
    initializing the planar target based on the first reference image;
    displaying an augmented reality representation of the planar target based upon the initialization;
    tracking the planar target as the camera moves from the first camera pose to a second camera pose;
    displaying a distorted augmented reality representation of the planar target as the camera moves from the first camera pose;
    selecting a second reference image based on an amount of movement or change in a camera pose from the first camera pose to the second camera pose meeting a threshold; and
    displaying a more accurate augmented reality representation of the planar target based on the tracked planar target and the second reference image.

2. The processor-implemented method of claim 1, further comprising:
    assuming a fronto-parallel view of the planar target as a parameter for initializing the planar target.

3. The processor-implemented method of claim 2, further comprising:
    creating a rectified view of the planar target from the first reference image or the second reference image if neither the first reference image nor the second reference image are actual fronto-parallel views of the planar target.

4. The processor-implemented method of claim 1, wherein initializing the planar target based on the first reference image further comprises assigning the entire first reference image as the planar target.

5. The processor-implemented method of claim 1, wherein initializing the planar target based on the first reference image further comprises:
    determining, for each feature of the planar target in the first reference image, a respective reference feature location within the planar target.

6. The processor-implemented method of claim 1, wherein selecting the second reference image based upon the amount of movement or change in the camera pose from the first camera pose to the second camera pose meeting the threshold comprises:
    measuring one or more translations, wherein each translation is measured between the first camera pose associated with the first reference image and a subsequent camera pose associated with one of one or more subsequent images; and
    selecting one of the one or more subsequent images as the second reference image based upon the corresponding measured translation meeting the threshold.

7. The processor-implemented method of claim 1, wherein displaying the more accurate augmented reality representation of the planar target based on the tracked planar target and the second reference image comprises:
    extracting a plurality of reference features from the planar target in the first reference image;
    extracting reference features from the second reference image;
    matching reference from the second reference image to the plurality of reference features from the planar target in the first reference image;
    triangulating matching reference features from the second reference image and from the planar target in the first reference image; and,
    using the triangulation of the matching reference features to generate the more accurate augmented reality representation of the planar target.

8. The processor-implemented method of claim 1, wherein the planar target is one or more of: partially occluded in the first reference image, of any planar shape, or in any orientation relative to gravity.

9. The processor-implemented method of claim 1, wherein displaying the distorted augmented reality representation comprises displaying the distorted augmented reality representation prior to processing the second reference image.

10. The processor-implemented method of claim 1, wherein displaying the more accurate augmented reality representation of the planar target comprises updating the augmented reality representation based on tracking the planar target in six degrees of freedom.

11. A non-transitory computer readable medium containing executable program instructions to configure a processor to:
    determine a planar target in a first reference image captured at a first camera pose of a camera, wherein the planar target includes one or more features;
    initialize the planar target based on the first reference image;
    display an augmented reality representation of the planar target based upon the initialization;
    track the planar target as the camera moves from the first camera pose to a second camera pose;
    display a distorted augmented reality representation of the planar target as the camera moves from the first camera pose;

select a second reference image based on an amount of movement or change in a camera pose from the first camera pose to the second camera pose meeting a threshold; and display a more accurate augmented reality representation of the planar target based on the tracked planar target and the second reference image.

12. The medium of claim 11, wherein the instructions to initialize the planar target comprise instructions to configure the processor to:

assume a fronto-parallel view of the planar target as a parameter for initializing the planar target.

13. The medium of claim 12, further comprising instructions to configure the processor to:

create a rectified view of the planar target from the first reference image or the second reference image if neither the first reference image nor the second reference image are actual fronto-parallel views of the planar target.

14. The medium of claim 11, wherein the instructions to initialize the planar target based on the first reference image comprise instructions to configure the processor to assign the entire first reference image as the planar target.

15. The medium of claim 11, wherein the instructions to initialize the planar target based on the first reference image comprise instructions to configure the processor to:

determine, for each feature of the planar target in the first reference image, a respective reference feature location within the planar target.

16. The medium of claim 11, wherein the instructions to select the second reference image based upon the amount of movement or change in the camera pose from the first camera pose to the second camera pose meeting the threshold comprise instructions to configure the processor to:

measure one or more translations, wherein each translation is measured between the first camera pose associated with the first reference image and a subsequent camera associated with one of one or more subsequent images; and select one of the one or more subsequent images as the second reference image based upon the corresponding measured translation meeting the threshold.

17. The medium of claim 11, wherein the instructions to display the more accurate augmented reality representation of the planar target based on the tracked planar target and the second reference image comprise instructions to configure the processor to:

extract a plurality of reference features from the planar target in the first reference image;

extract reference features from the second reference image;

match reference from the second reference image to the plurality of reference features from the planar target in the first reference image;

triangulate matching reference features from the second reference image and from the planar target in the first reference image; and use the triangulation of the matching reference features to generate the more accurate augmented reality representation of the planar target.

18. The medium of claim 11, wherein the planar target is one or more of: partially occluded in the first reference image, of any planar shape, or in any orientation relative to gravity.

19. The medium of claim 11, wherein the instructions to display the distorted augmented reality representation comprises instructions to configure the processor to display the distorted augmented reality representation prior to processing the second reference image.

20. The medium of claim 11, wherein the instructions to display the more accurate augmented reality representation comprises instructions to configure the processor to update the augmented reality representation based on tracking the planar target in six degrees of freedom.

21. A data processing device comprising:

a storage device comprising stored instructions; and a processor coupled to the storage device, wherein the processor is configured to:

determine a planar target in a first reference image captured at a first camera pose of a camera, wherein the planar target includes one or more features;

initialize the planar target based on the first reference image;

display an augmented reality representation of the planar target based upon the initialization;

track the planar target as the camera moves from the first camera pose to a second camera pose;

displaying a distorted augmented reality representation of the planar target as the camera moves from the first camera pose;

select a second reference image based on an amount of movement or change in a camera pose from the first camera pose to the second camera pose meeting a threshold; and displaying a more accurate augmented reality representation of the planar target based on the tracked planar target and the second reference image.

22. The data processing device of claim 21, wherein the processor is further configured to:

assume a fronto-parallel view of the planar target as a parameter for initializing the planar target.

23. The data processing device of claim 22, wherein the processor is further configured to:

create a rectified view of the planar target from the first reference image or the second reference image if neither the first reference image nor the second reference image are actual fronto-parallel views of the planar target.

24. The data processing device of claim 21, wherein to initialize the planar target based on the first reference image, the processor is further configured to assign the entire first reference image as the planar target.

25. The data processing device of claim 21, wherein to initialize the planar target based on the first reference image, the processor is further configured to:

determine, for each feature of the planar target in the first reference image, a respective reference feature location within the planar target.

26. The data processing device of claim 21, wherein to select the second reference image based upon the amount of movement or change in the camera pose from the first camera pose to the second camera pose meeting the threshold, the processor is configured to:

measure one or more translations, wherein each translation is measured between the first camera pose associated with the single first reference image and a subsequent camera pose associated with one of one or more subsequent images; and select one of the one or more subsequent images as the second reference based upon the corresponding measured translation meeting the threshold.

27. The data processing device of claim 21, wherein to display the more accurate augmented reality representation of the planar target based on the tracked planar target and the second reference image, the processor is configured to:
- extract a plurality of reference features from the planar target in the first reference image;
- extract reference features from the second reference image;
- match reference from the second reference image to the plurality of reference features from the planar target in the first reference image;
- triangulate matching reference features from the second reference image and from the planar target in the first reference image; and
- use the triangulation of the matching reference features to generate the more accurate augmented reality representation of the planar target.

28. The data processing device of claim 21, wherein the planar target is one or more of: partially occluded in the first reference image, of any planar shape, or in any orientation relative to gravity.

29. The data processing device of claim 21, wherein to display an distorted augmented reality representation the processor is configured to display the distorted augmented reality representation prior to processing the second reference image.

30. The data processing device of claim 21, wherein to display the more accurate augmented reality representation of the planar target the processor is configured to update the augmented reality representation based on tracking the planar target in six degrees of freedom.

31. An apparatus for planar target creation and tracking comprising:
- means for determining a planar target in a first reference image captured at a first camera pose of a camera, wherein the planar target includes one or more features;
- means for initializing the planar target based on the first reference image;
- means for displaying an augmented reality representation of the planar target based upon the initialization;
- means for tracking the planar target as the camera moves from the first camera pose to a second camera pose;
- means for displaying a distorted augmented reality representation of the planar target as the camera moves from the first camera pose;
- means for selecting a second reference image based on an amount of movement or change in a camera pose from the first camera pose to the second camera pose meeting a threshold; and
- means for displaying a more accurate augmented reality representation of the planar target based on the tracked planar target and the second reference image.

32. The apparatus of claim 31, further comprising assuming a fronto-parallel view of the planar target as a parameter for initializing the planar target.

33. The apparatus of claim 32, further comprising:
- means for creating a rectified view of the planar target from the first reference image or the second reference image if neither the first reference image nor the second reference image are fronto-parallel views of the planar target.

34. The apparatus of claim 31, wherein the means for initializing the planar target based on the first reference image further comprises means for assigning the entire first reference image as the planar target.

35. The apparatus of claim 31, wherein the means for initializing the planar target based on the first reference image further comprises:
- means for determining, for each feature of the planar target in the first reference image, a respective corresponding feature location within the planar target.

36. The apparatus of claim 31, wherein means for selecting the second reference image based upon the amount of movement or change in the camera pose from the first camera pose to the second camera pose meeting the threshold comprises:
- means for measuring one or more translations, wherein each translation is measured the first camera pose associated with the first reference image and a corresponding subsequent camera pose associated with one of one or more subsequent images; and
- means for selecting one of the one or more subsequent images as the second reference image based upon the corresponding measured translation meeting the threshold.

37. The apparatus of claim 31, wherein means for displaying the more accurate augmented reality representation of the planar target based on the tracked planar target and the second reference image comprises:
- means for extracting a plurality of reference features from the planar target in the first reference image;
- means for extracting reference features from the second reference image;
- means for matching reference from the second reference image to the plurality of reference features from the planar target in the first reference image;
- means for triangulating matching reference features from the second reference image and from the planar target in the first reference image; and
- means for using the triangulation of the matching reference features to generate the more accurate augmented reality representation of the planar target.

38. The apparatus of claim 31, wherein the planar target is one or more of: partially occluded in the first reference image, of any planar shape, or in any orientation relative to gravity.

39. The apparatus of claim 31, wherein means for displaying the distorted augmented reality representation comprises displaying the distorted augmented reality representation prior to processing the second reference image.

40. The apparatus of claim 31, wherein the means for displaying the more accurate augmented reality representation of the planar target comprises means for updating the augmented reality representation based on tracking the planar target in six degrees of freedom.

* * * * *